July 11, 1950  LE ROY E. TOWNSEND  2,515,103

FISHING LURE

Filed July 3, 1948

INVENTOR:
LE ROY EARL TOWNSEND
BY
W E Beatty
ATTORNEY.

Patented July 11, 1950

2,515,103

UNITED STATES PATENT OFFICE 2,515,103

FISHING LURE

Le Roy Earl Townsend, West Los Angeles, Calif.

Application July 3, 1948, Serial No. 37,009

4 Claims. (Cl. 43—42.47)

The invention relates to a fishing lure and more particularly to an improved fin-like device for imparting a life-like wiggly motion to the lure when it is pulled through the water.

For further details of the invention, reference may be made to the drawings wherein Fig. 1 is a side view in elevation partly in section.

Figure 1:
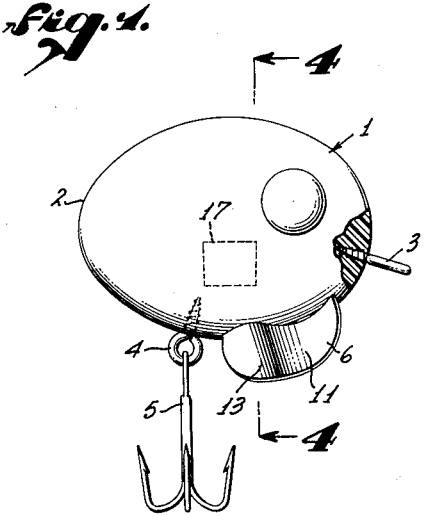
Figure 2:
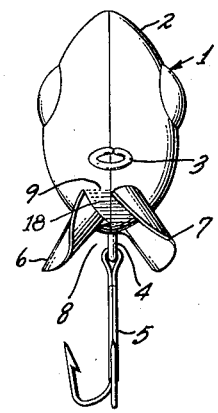
Fig. 2 is a front view in elevation.
Figure 3:
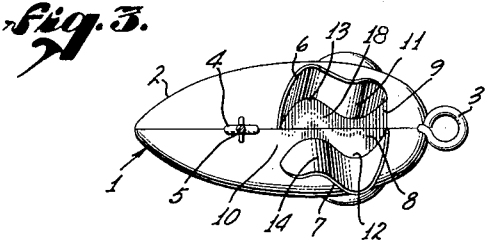
Fig. 3 is a bottom plan view.

Referring in detail to the drawings, the lure 1 is here illustrated as a body 2 having an elliptical shape 2 when seen in side view and also in end view as shown in Figs. 1 and 2, although various other shapes may be employed. The lure has a screw eye 3 for attachment to the fishing line, and a rear vertical screw eye 4 for the treble hook 5.

In order to provide a life-like wiggly motion to the lure when it is drawn through the water, there are provided two fins 6 and 7 which provide a longitudinal, tortuous channel 8 having an entrance 9 forward at one side of the center line of the lure, and an exit 10 aft on the other side of the center line.

The fins 6 and 7 are plate-like in having a thickness which is small in proportion to the length and breadth thereof, and these fins are located somewhat in the position of the pectoral fins at the lower forward portion of the body. Each of the fins 6 and 7 as seen in cross-section is sinuous, that is, somewhat in the shape of a sine curve, and, as seen from the center line, the peak 11 on fin 6 is opposite the trough 12 on the other fin 7, while the trough 13 of fine 6 is opposite the peak 14 of fin 7, each fin having one trough and one peak. The front ends of the fins 6 and 7 terminate at and merge with the body of lure 1 a short distance behind the front of the body, while the rear ends of fins 6 and 7 terminate at and merge with the body adjacent its middle portion. The screw eye 4 is positioned forward of the rear end of body 2, adjacent the rear of fins 6 and 7 where it offers little or no resistance to sideways or wiggly motion imparted by the fins 6 and 7. The tail of body 2 has no hooks or other attachments to impede the action of fins 6 and 7.

Tests have shown that the above arrangement of fins imparts a rapid, life-like, lateral, oscillating movement to the lure as it is pulled through the water, some of this action being due to the reaction between the water and the outside curvature of the fins which terminate adjacent the longitudinal middle portion of the body of lure 6.

Preferably the fins 6 and 7 diverge outwardly in a downward direction as illustrated.

The lure 1 may be made of wood and the fins 6 and 7 of metal, a recess being gouged into the wood to insert the base of the fins 6 and 7 therein, cement being used to hold such fins in place.

Figure 4:
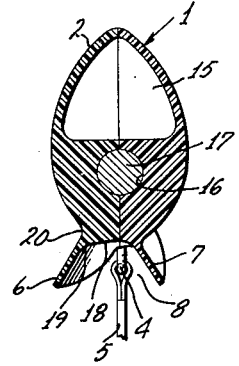
Fig. 4 is a sectional view on line 4—4 of Fig. 1, looking in the direction of the arrows, with the hook removed and with the fins shown tapering into the body in this figure only.

Preferably, however, the lure 1 is a molding of thermoplastic material, with a parting line on a vertical median plane as illustrated in Fig. 4. In this case the fin 6 is molded integral with its half of the lure, while the fin 7 is molded integral with its half. The two halves are cemented together and are hollow at their upper portion to provide an air chamber 15 at the upper portion of the lure so that it will float upright, and a lower chamber 16 for a weight 17 of lead or the like.

To assist the draft of the die, the ventral portion of the lure between the fins 6 and 7 is straight or slightly tapered, as indicated at 18, and the base of each fin may be tapered into the body, as illustrated at 19 and 20 as shown in Fig. 4, this feature not being necessary as shown in the other figures.

When the body of the lure is made of wood, a suitable weight corresponding to weight 17 may be let into the lure for a similar purpose.

Various modifications may be made in the invention without departing from the spirit of the following claims.

For example, the fins may be vertical instead of diverging, although the latter is preferred as giving the best results. While various sizes may be used, the scale in the drawing is double the size of a lure which has been made and tested with results as described. The position of the weight may be varied but preferably it is in front of the screw eye 4 above the rear portion of the fins 6 and 7 as shown in Fig. 1. Also the height and length of the waves or longitudinal curvature in the fins may be varied.

I claim:

1. A fishing lure comprising a body having sinuous, pectoral-like fins spaced apart and depending from opposite sides of the lower front portion of said body, said fins providing a tortuous channel under said body, said tortuous channel having an entrance at one side of the bottom center line of the lure, and an exit at the other side of the center line, said fins terminating adjacent the longitudinal middle portion of the bottom of said body, and a hook suspension adjacent to rear of said fins at the bottom of said body and in advance of the rear end of said body.

2. A fishing lure comprising a two piece molding cemented together and having a parting line on a vertical median plane, a motion imparting fin forming an integral molding with one of said pieces at the lower forward portion of its half, and a cooperating motion imparting fin opposite thereto and forming an integral molding with the other half, said fins providing therebetween a tortuous channel extending lengthwise of the lure.

3. A fishing lure comprising pectoral like fins spaced apart at opposite sides of the front and extending downwardly under the front portion of the lure, said fins having longitudinal waves providing a channel with corresponding reverse curved walls along the bottom of the lure, said fins having forward ends behind the front end of said lure, said fins terminating adjacent the under longitudinal middle portion of the lure.

4. A fishing lure comprising a lure body having sinuous, pectoral-like fins diverging outwardly from the body, said fins being spaced apart and providing a tortuous channel having an entrance at one side of the bottom center line of the lure, and an exit at the other side of the center line adjacent the longitudinal middle of the bottom of said lure, means for maintaining said body upright while propelled through the water whereby said fins extend downwardly, and a hook suspension adjacent said exit forward of the rear of said body.

LE ROY EARL TOWNSEND.

REFERENCES CITED

The following references are of record in the file of this patent:

UNITED STATES PATENTS

| Number | Name | Date |
|---|---|---|
| 1,657,164 | Kendall | Jan. 24, 1928 |
| 1,805,416 | Raymond | May 12, 1931 |
| 2,149,054 | Jones | Feb. 28, 1939 |